United States Patent
Van Doren et al.

(10) Patent No.: US 8,184,689 B2
(45) Date of Patent: May 22, 2012

(54) METHOD VIDEO ENCODING AND DECODING PRESERVING CACHE LOCALITIES

(75) Inventors: Giel Van Doren, Lommel (BE);
Abraham Karel Riemens, Eersel (NL);
Frederik Jan De Bruijn, Eindhoven (NL)

(73) Assignee: Entropic Communications Inc., San Diego, CA (US)

( * ) Notice: Subject to any disclaimer, the term of this patent is extended or adjusted under 35 U.S.C. 154(b) by 948 days.

(21) Appl. No.: 12/063,855

(22) PCT Filed: Aug. 7, 2006

(86) PCT No.: PCT/IB2006/052721
§ 371 (c)(1),
(2), (4) Date: Feb. 15, 2008

(87) PCT Pub. No.: WO2007/020560
PCT Pub. Date: Feb. 22, 2007

(65) Prior Publication Data
US 2008/0232462 A1      Sep. 25, 2008

(30) Foreign Application Priority Data

Aug. 17, 2005   (EP) ..................................... 05107557
Sep. 29, 2005   (EP) ..................................... 05108995

(51) Int. Cl.
*H04N 7/12* (2006.01)
(52) U.S. Cl. ............... 375/240.01; 375/240.26
(58) Field of Classification Search ........................ None
See application file for complete search history.

(56) References Cited

U.S. PATENT DOCUMENTS 5,636,033 A * 6/1997 Maeda .......................... 382/240
(Continued)

FOREIGN PATENT DOCUMENTS

EP          1542474 A1      6/2005
(Continued)

OTHER PUBLICATIONS

Ge, S; et al "Efficient Multithreading Implementation of H.264 Encoder on Intel Hyper-Threading Architectures" Proceedings of the Fourth International Conference on Information, Communications and Signal Processing and the Fourth Pacific-Rim Conference on Multimedia (ICICS-PCM 2003), Dec. 15, 2003, pp. 469-473.

(Continued)

*Primary Examiner* — Hong Cho

(57) ABSTRACT

The invention relates to a method for encoding/decoding a video stream including a plurality of images (A, B, C) in a video processing apparatus having a processing unit (11) coupled to a first memory (12), further comprising a second memory (13), comprising the steps: providing a subset of image data stored in the second memory (13) in the first memory (12), —simultaneous encoding/decoding of more than one image (B, C) of the video stream, by accessing said subset, wherein the simultaneously encoding/decoding is performed by access sharing to at least one image (A). For reducing the traffic or the number of access to second memory (13) an apparatus is proposed including: a processing unit (11) for performing an encoding/decoding process of video data; a first memory (12) coupled to the processing unit (11) for storing image data required for encoding/decoding of video data, —a second memory (13), wherein the video stream includes a plurality of images (A, B, C); the first memory (11) is adapted to store a subset of image data of the second memory (13) in the first memory (12) and the processing unit (11) is adapted to simultaneously encode/decode more than one image (B, C) of the video stream by accessing said subset of image data in the first memory (12), wherein the simultaneously encoding/decoding is performed by sharing access to at least one image.

11 Claims, 5 Drawing Sheets

U.S. PATENT DOCUMENTS

Figure 1:
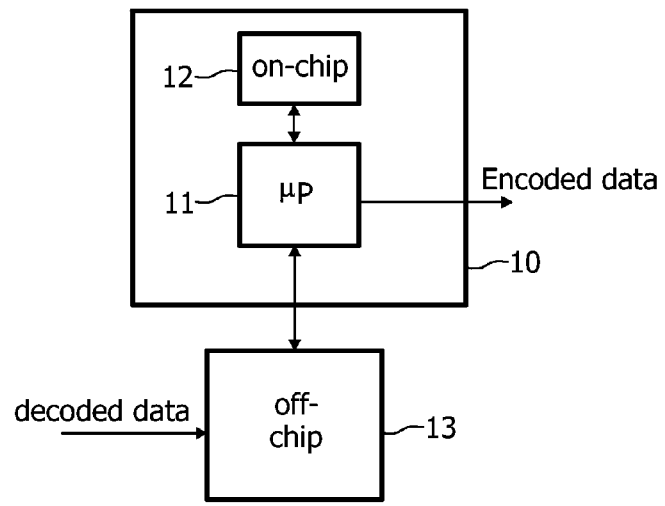

| | | | | |
|---|---|---|---|---|
| 5,636,314 A | * | 6/1997 | Murayama | 386/235 |
| 5,841,475 A | * | 11/1998 | Kurihara et al. | 375/240.15 |
| 6,243,140 B1 | * | 6/2001 | Suzuki | 348/448 |
| 6,263,112 B1 | | 7/2001 | Watanabe et al. | |
| 6,735,340 B1 | | 5/2004 | Ohno | |
| 6,870,883 B2 | * | 3/2005 | Iwata | 375/240.01 |
| 2006/0023789 A1 | * | 2/2006 | Yamashita et al. | 375/240.16 |
| 2006/0023793 A1 | * | 2/2006 | Kagechi et al. | 375/240.24 |
| 2009/0051808 A1 | * | 2/2009 | Sumioka et al. | 348/420.1 |

FOREIGN PATENT DOCUMENTS

| | | |
|---|---|---|
| JP | 05-290461 | 11/1993 |
| JP | 06-205395 | 7/1994 |
| JP | 11-298903 | 10/1999 |
| JP | 2002-247583 | 8/2002 |
| JP | 2004-072301 | 3/2004 |

OTHER PUBLICATIONS

Tsao, H-K; et al "An Efficient Macroblock-Sync Decoding Architecture for MPEG-4 FGS Video" Proceedings of the 45th Midwest Symposium on Circuits and Systems, vol. 1 of 3, Aug. 4, 2002, pp. 232-235.

Chen, Y-K; et al "Media Applications on Hyper-Threading Technology" Intel Technology Journal, US, Feb. 2002, pp. 1-11.

* cited by examiner

METHOD VIDEO ENCODING AND DECODING PRESERVING CACHE LOCALITIES

Priority Claims/Related Applications

This application is a 371 U.S. national stage filing of (and claims the benefit and priority to under 35 U.S.C. 119 and 120) PCT/IB06/52721 filed on Aug. 7, 2006, which in turn claims the benefit of under 35 U.S.C. 119 to European Patent Application Serial No. 05108995.1 filed on Sep. 29, 2005, and to European Patent Application Serial No. 05107557.0 filed on Aug. 17, 2005, all of which are incorporated herein by reference.

The invention relates to method for encoding/decoding video data. Further it relates to an apparatus for encoding/decoding video data.

In video encoding/decoding reference frames are used. Typical examples of such coding are standards like MPEG2, H.264, etc. However, also in proprietary algorithms for e.g. web cams, reference frames are used.

A video processing apparatus includes in general a processor, e.g. a digital signal processor for performing the encoding/decoding calculation based on uncompressed/or encoded video data. There are different kinds of memories connected to that processor. Normally the video data are stored in memory having a large storage capacity, since there is a large amount of data to be processed for high quality video. Additionally there is smaller size memory coupled to the processor serving as temporary buffer. The larger size memory for storing the video is coupled via a connection to the processor having a limited bandwidth. The memory used as temporary buffer is connected via a connection having a higher bandwidth than the large memory connection. Mostly the large memory is arranged outside the chip including the processor; therefore it is designated as off-chip memory, wherein the temporary buffer is located on the same chip, thus called on-chip memory.

Reference images used for encoding/decoding are typically too large to fit in on-chip memory completely. For SD MPEG decoding it is required to store 1.2 Mbytes of reference image data. For HD MPEG decoding, it can take up to 6 Mbytes. For MPEG encoding, even more image memories are needed for image reordering. So for using such reference images an access to off-chip memory is required.

However also as result of long-term technology progress feature size decreases, so both memories may reside on a single chip. Also in this case, several levels of caching will be built. A first cache level will be "close" to processing units, wherein next cache levels will be at "larger distance" and have larger memory sizes. The reasoning still holds that bandwidth to a next level cache is significantly smaller than bandwidth to a first cache level. So the memory bottleneck will remain an important issue in future systems.

The trend to an increased picture resolution causes the reference frames to become larger in size, and thus requiring more memory to store. Hereby is it likely that in the future the reference frames will still be stored in off-chip memory. This results also in a higher off-chip memory bandwidth.

Further, the performance gap between processing or computational power and memory communication will increase with progress in silicon technology. Hence, both bandwidth considerations and memory access latency will become more dominant design parameters. Both endanger efficient utilization of the processing power on-chip due to lack of data.

More and more signal processing functions are designed for mobile applications with the obvious emphasis on power consumption. This poses an extra pressure to reduce off-chip communication, since high bandwidth off-chip communication requires substantial power.

Standard memory components usually comply to interface standards posing fixed bandwidth limits. Such bottleneck or limited bandwidth capacity imposes a very rigid limitation on the video processing system. For relaxing such limitation significant cost increasing is required. So it is possible to double the number of off-chip memory chips to double bus bandwidth. This increases system cost and Si-area and chip pin count.

As a result of these trends, the memory bottleneck will become even more prominent in the future.

The U.S. Pat. No. 6,263,112 B1 describes a motion vector searching apparatus and motion picture coding apparatus. It describes to reduce bandwidth requirements for video processing. Reference frames are used for encoding/decoding of video data. It is noted that B frames put the largest burden on bandwidth to reference frames, since B frame coding typically requires two reference frames, an I-frame and a P-frame. It discloses to use only a single reference frame for B frame coding, thereby taking advantage of previously calculated motion vectors. The motion vector is stored in a motion vector data storage memory. The reduction of bandwidth requirements results in a reduced image quality. Further, it is applicable only on an encoder. Additionally it increases the bit rate since not all features of the standard can be exploited.

Therefore it is object of the present invention to provide a method and an arrangement reducing the off-chip memory traffic for video encoding/decoding, without reduction of image quality or increasing of bit rate.

The object of the present invention is solved by the features of the independent claims.

The invention is based on the observation that a reference image is accessed multiple times for processing successive images. This holds for decoding as well as for encoding. In prior art, these accesses are relatively far apart in time and require separate accesses to the same image data in off-chip memory, or require that complete reference images are stored on-chip in the first memory.

The present invention proposes to utilize a single access to a subset of image data multiple times for processing multiple images, without having to store the complete reference images on chip. This is done by processing successive images simultaneously.

Most compression standards use motion compensation for the predictor. Causality constraints and differences in motion vectors prevent that exactly the same data is required at exactly the same moment in time for the images processed simultaneously. To overcome this discrepancy, a small on-chip buffer is still required. This on-chip buffer is designated in the following as first memory. The first memory contains a window or a subset of a reference image, in the order of the maximum vector range. The complete reference images are stored in the large second memory, typically located off-chip.

Since the first memory contains the relevant part of the reference image, it can also be used to compensate for the long latency of the second memory.

The idea is applicable for both video encoders and decoders independently. Examples are MPEG, and H.264. It is both useful in software and hardware encoding/decoding realizations.

In an advantageous embodiment at least one of the simultaneously encoded/decoded images is used as a reference image for encoding/decoding at least one of the other simultaneously encoded/decoded images. Thus the off-chip memory accesses are further reduced and reducing processing time and power consumption.

In another embodiment it is preferred that simultaneously encoded/decoded images share access to a common reference image. The subset stored in the first memory includes data of a common reference image used for encoding/decoding both simultaneously encoded/decoded images.

In a preferred embodiment the writing of data into the first memory and the reading of data from the first memory are synchronized, such that the part of the reference image required for decoding a dependent image or a part thereof is already decoded before starting decoding the dependent image. Thus it is assured that writing is ahead of reading between two simultaneously encoded/decoded images It is further advantageous required to synchronize the accesses in the first memory for ensuring that the decoding/encoding of the first image of the simultaneously encoded/decoded images occurs at substantially equal image positions of the second image. Thus the amount of data stored in the first memory is kept small.

The synchronizing of the accesses in the first memory ensures that the accesses of the shared common reference image during simultaneously encoding/decoding first and second images occur at substantially equal image positions of the common reference image. This synchronizing assures that two reading accesses on a shared image are at about the same location.

In a further preferred embodiment the synchronization of the accesses is based on a vertical location in the respective images used as common reference image.

Preferably synchronization offsets between the accesses are based on maximum vertical component of the motion vector. The synchronization offset refers to the vertical difference between position in the image where the first image is written and position where the second image is being processed. For decoding the second image, data from the first image is required. That data needs to be written first. The precise position of the read access in the first image depends on a motion vector. This motion vector is obtained from the bit stream of the second image. According to the prior art, this would require a check and synchronization at every read operation in the first image. This results in many checks and synchronization actions, causing significant extra operations and complexity. However, there is usually a maximum value for the motion vectors. By using this maximum value as synchronization criterion, all possible vector values can be accessed and synchronization does not depend on specific vector values anymore.

Furthermore, by using only the vertical component of the maximum vector, the check and synchronization only needs to occur when vertically advancing over the image.

In a further preferred embodiment a search process is performed searching within the compressed data for the start of next image. Thus it is possible to simultaneously decode multiple images.

In a further preferred embodiment for encoding process the encoded stream is encoded in parallel. The encoded different images are concatenated to produce an image sequential bitstream according to the standard.

During encoding it is further possible to limit the size of the motion vector. Thereby it is possible to consider the size of the first memory, so that the working set of data does not exceed the first memory size.

The object is also solved by a video processing apparatus including a processing unit for performing an encoding/decoding process of video data; a first memory coupled to the processing unit for storing image data required for encoding/decoding of video data and a second memory, wherein the video stream includes a plurality of images; the first memory is adapted to store a subset of image data of the second memory in the first memory and the processing unit is adapted to simultaneously encode/decode more than one image of the video stream by accessing said subset of image data in the first memory, wherein the simultaneously encoding/decoding is performed by sharing access to at least one image.

In a further preferred embodiment, multiple processing units are arranged, each operating at the same time and processing a single image. This way, task level parallelism is effectively utilized to encode/decode a single video stream. The multiple processors will access a single first memory.

In yet another embodiment, a plurality of first memories is available, each located closely to their respective processing units. In this case, additional communication means are required between the first memories to duplicate the image data over the first memories. An example of such system is a multi-processor system where each processor is equipped with its own level 0 cache. Cache coherency hardware takes care of duplicating the image data over the various caches.

Other objects and advantages of the present invention will become apparent during the following discussion in conjunction with the accompanying drawings. Preferred embodiments of the invention are described in detail below, by way of example only, with reference to the following schematic drawings.

Figure 2:
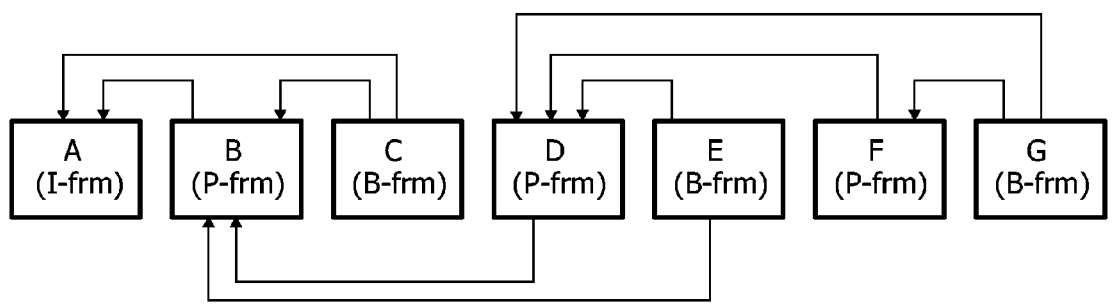
Figure 3:
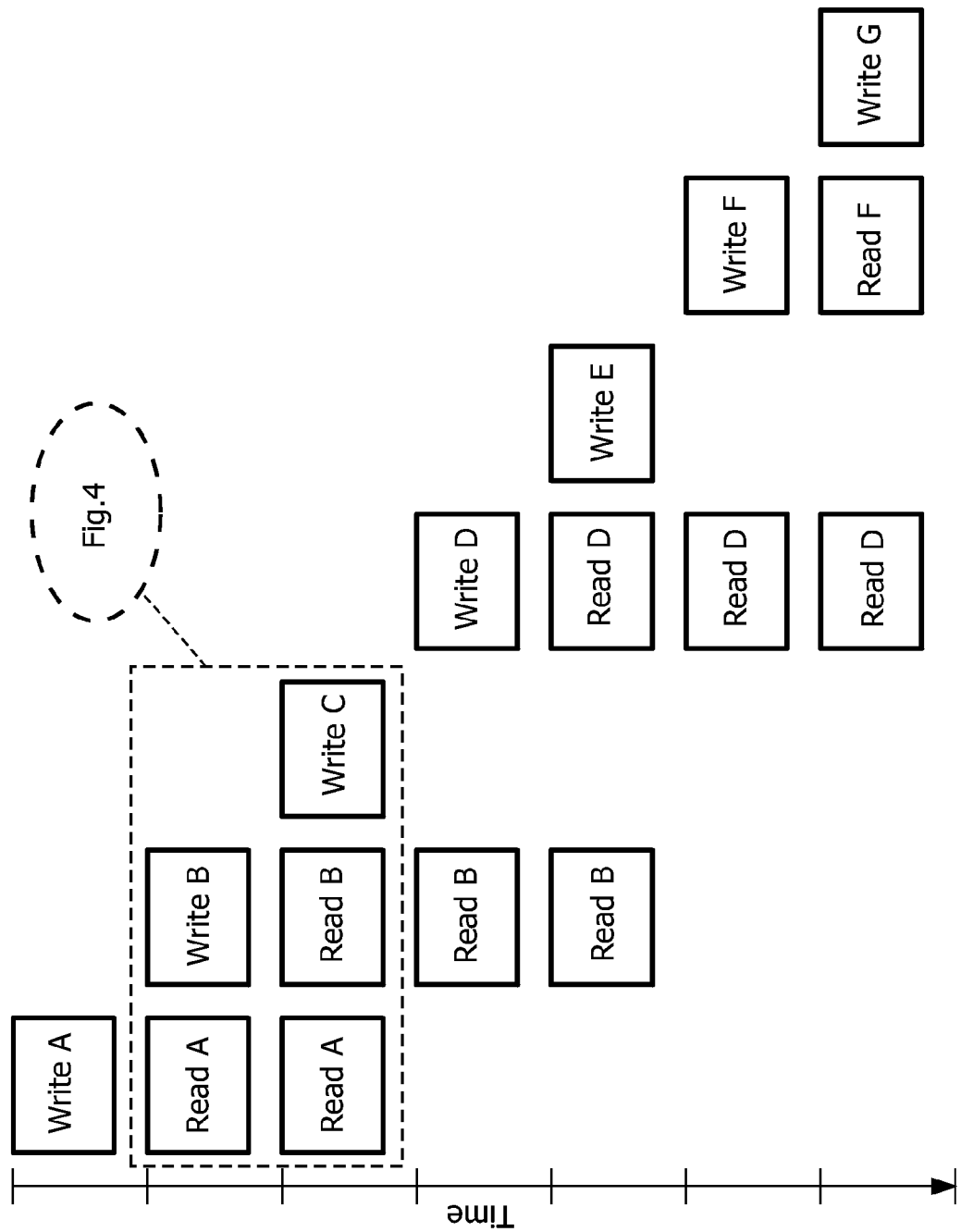
Figure 4:
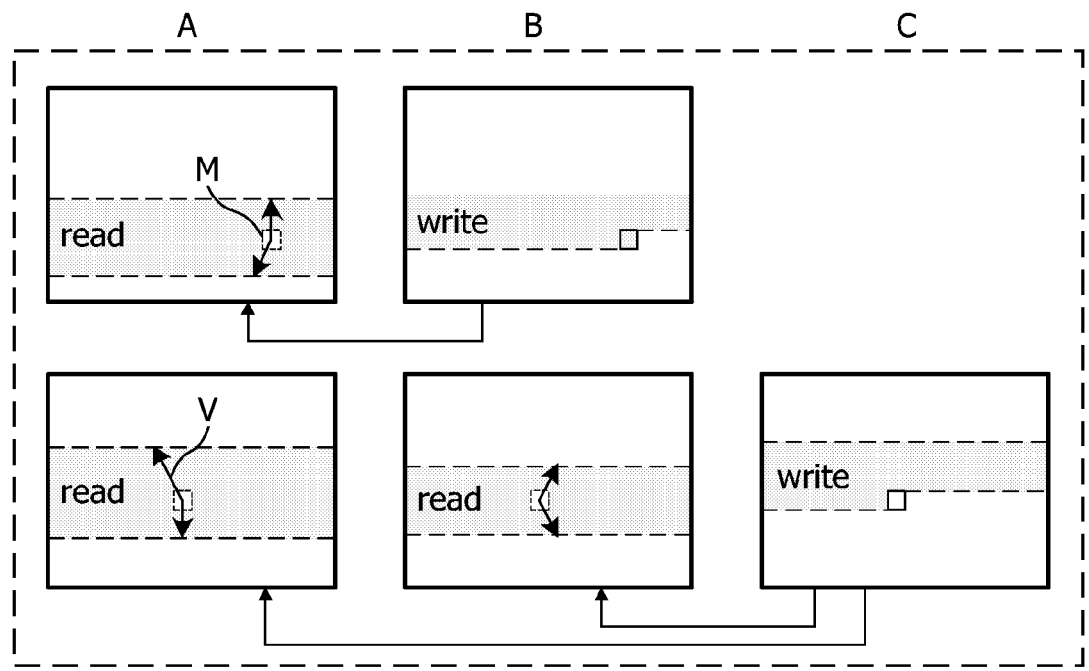
Figure 5:
Figure 5:
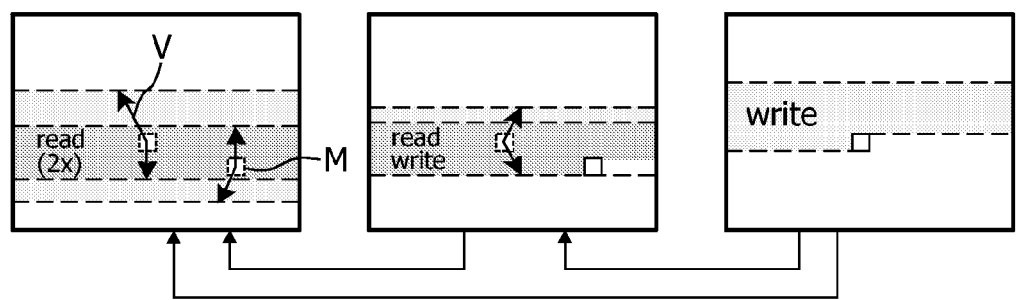
Figure 6:
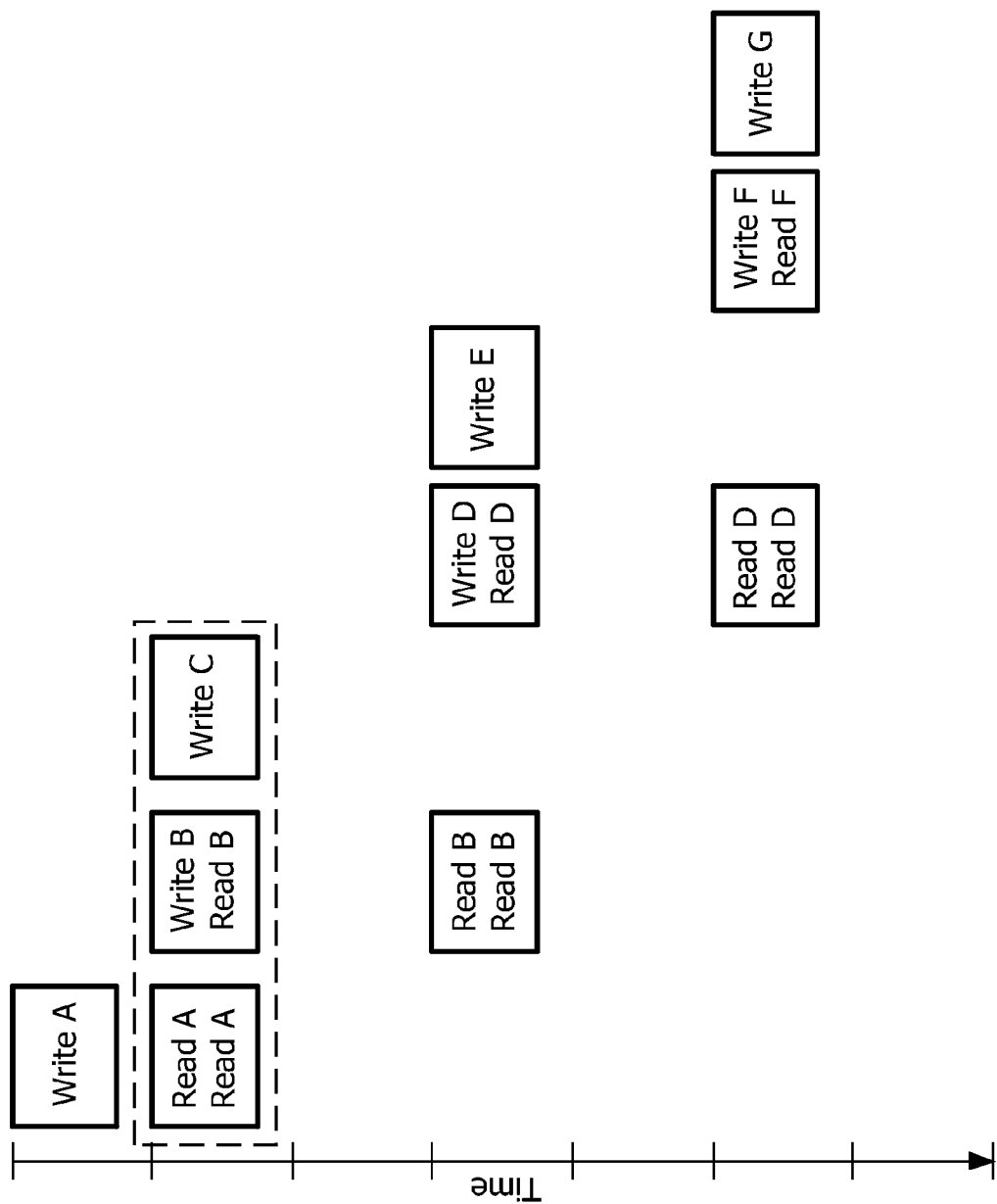
Figure 7:
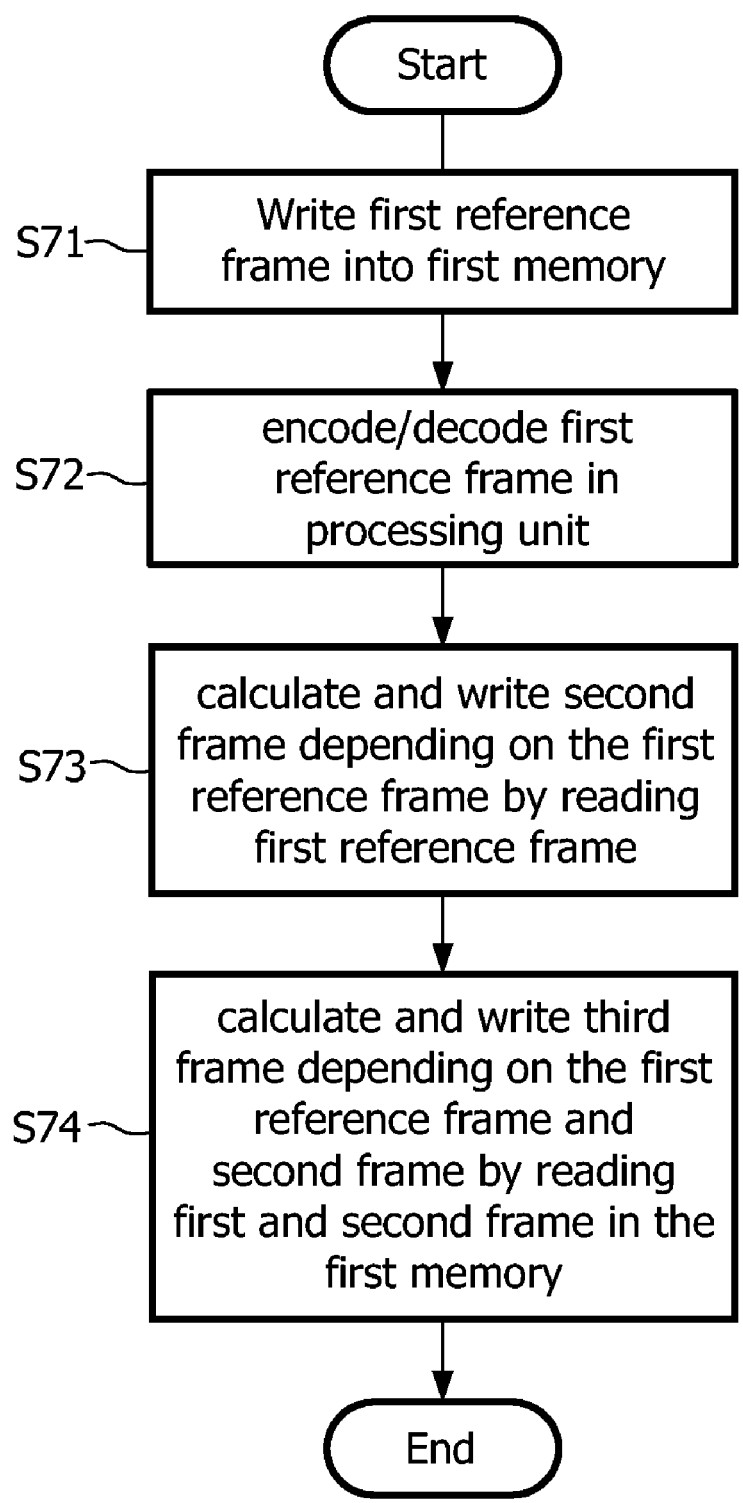

FIG. 1 a schematic structure of a video processing apparatus according to the invention;

FIG. 2 an illustration of dependencies of images (GOP);

FIG. 3 an illustration of read and write accesses to images for decoding the sequence of images as shown in FIG. 2 according to the prior art;

FIG. 4 an illustration showing that read and write accesses of the section in FIG. 3 according to the prior art which are limited to an image window;

FIG. 5 an illustration showing overlapping image windows for simultaneous calculation/decoding of two images according to the present invention;

FIG. 6 an illustration showing the reduction of reading accesses according to the present invention when decoding two images in parallel;

FIG. 7 presents a multiple processor configuration having multiple first memories;

The drawings are provided for illustrative purpose only and do not necessarily represent practical examples of the present invention to scale.

In the following the various exemplary embodiments of the invention are described.

Although the present invention is applicable in a broad variety of applications it will be described with the focus put on MPEG encoding/decoding applications. A further field for applying the invention might be the H.264/AVC algorithm or any other encoding/decoding algorithm using reference images.

FIG. 1 illustrates a structure of a video processing apparatus as used for the present invention. There is a processing unit 11, e.g. a digital signal processor or a fixed-function block, performing the encoding/decoding process. A first memory 12 is coupled to the processing unit 11 having a large bandwidth connection. The memory management can be directly controlled by the processing unit 11. A not illustrated further control unit may also perform this, using e.g. direct memory access (DMA) techniques. As a further alternative, the first memory 12 may behave as a data cache of the second memory 13, and generic caching strategies determine which data is available in the first memory 12.

The second memory 13 may be arranged outside the chip 10. The second memory 13 has a higher storage capacity than the first memory 11. The connection from the second memory 13 to the processing unit 11 is limited in its bandwidth. In case of using a further memory control unit it is possible to write data direct from second memory 13 to the first memory 11 without using the processing unit 11. FIG. 1 illustrates the decoding direction, wherein the same apparatus is used for the encoding direction, by only exchanging input and output of data.

FIG. 2 illustrates the dependencies of images in case of MPEG2 coding. There are I-images, B-images and P-images. The I-image A is decoded without using a reference image. The P-image B is decoded by use of the I-image A as reference image. For decoding the B-image C the decoded P-image B and the decoded I-image A are used as reference images. Such sequence of images is called a GOP (group of pictures). The IPBPBPB . . . sequence is known as GOP structure. Different GOP structures can be used; e.g. IPBBPBBPBB . . . to which the present invention can be applied. A P-image depends on the predecessor I-image, and a B-image depends on the predecessor I-image as well as on the predecessor P-image.

Starting from the well known dependencies of images, which are also called frames, the writing/reading access for decoding the sequences of frames shown FIG. 2 is explained referring to FIG. 3. A video stream is encoded as a sequence of images. Normally, the images are decoded in the order of receiving the data. When a reference image A is used for decoding an image B, the reference image A that has been decoded before is reused. Typically, this reference image A has to be reread from off-chip or second memory 13 since the on-chip or first memory 12 is not large enough to keep the reference image A in the on-chip or first memory 12. As depicted in FIG. 3, a reference image A is written once, and two times reread for the purpose of being a reference image for decoding image B and image C. This requires a lot of off-chip or second memory 13 accesses.

FIG. 4 illustrates an enlarged section of FIG. 3. FIG. 4 illustrates the calculation of a macro block M. For calculating such macro block a region or part of the reference image A is required. The size of this access region or subset depends on the maximum size of the motion vectors V for the macro blocks. For each referenced image, such "search area" can be recognized. When the macro block position proceeds downwards in the image, the search area slides also downwards. In state of the art systems, the data from these search area windows is usually available in local buffers or caches, similar to the first memory of the present invention. FIG. 4 illustrates that the data from image A is read once to produce image B and once again to produce image C. Furthermore, at approximately the same output image location, the contents of the respective access regions show considerable overlap. This property is exploited in the present invention as illustrated in FIG. 5.

FIG. 5 illustrates overlapping image windows for simultaneous decoding of the two images B and C according to the present invention. Both images B and C require data from the image A. When decoding them simultaneously, this subset of image data is only read once from second memory 13 into first memory 12. The decoding process then uses this subset of image data from the first memory 12 twice. Since the decoding positions in the respective images may differ somewhat, the combined access region is slightly enlarged compared to the access region for only a single decoded image. FIG. 5 shows two overlapping access regions, indicated by the gray shading. The darker gray shading indicates the overlap of the two areas. The clear consequence of this approach is a reduction to 50% of the second memory traffic for image A data.

Both images B and C are decoded simultaneously. Note however, that image B is also a reference image for image C. In the present invention, the calculated image data of image B is stored in the first memory 12 as well as copied to the second memory 13. Thus an access region of image B for decoding image C is immediately available in first memory 12.

A conventional decoder needs to write image B to second memory 13 and later, when decoding image C it is read again from second memory 13. The current invention avoids the reading from second memory 13 yielding a reduction of 50% of second memory traffic for image B data.

The process of simultaneously decoding two images B and C is applied on the example of FIG. 3. The result according to present invention is shown in FIG. 6. In this image, the horizontal width of a block is illustrative for the bandwidth to an image in second memory 13. This height of a block is illustrative for the duration of the operation. The number of accesses to the second memory 13 is reduced significantly.

In the standard case as described in FIG. 3 five full accesses to the second memory are required (Read A, Write B, Read A, Read B, Write C) to decode image B and C. In the situation according to this invention described in FIG. 6 there are only three full accesses to the second memory 13 required (Read A, Write B, Write C). Thus a reduction by $2/5=40\%$ of off-chip bandwidth consumption is achieved. In this particular example, a choice is made to process two images B, C simultaneously. Other choices are possible, depending on GOP structure and availability of on-chip buffer memory or first memory 12. Thus two B images may be processed simultaneously. It is also possible to process an I-image and a P-image simultaneously. Further, it is possible to process more than two images simultaneously.

It should be noted, that the reduction of bandwidth occurs at the bandwidth peaks. When decoding a B-image C, three accesses are required to decode a single image (2× read, 1 write). For a P-frame B, two access are required, for an I-frame A only a single access. So as an additional advantage, this invention smoothes the bandwidth consumption over time. This relaxes the design target for off-chip bandwidth, since the system must support worst-case bandwidth consumption. Further it allows better scheduling and bus utilization due to the more constant bandwidth consumption of the video encoder/decoder.

The realization of this idea uses the standard decoding algorithm. Compared to a normal realization it requires only an additional synchronization process to ensure that the decoding of the image B is ahead of the calculation of the image C that depends on that reference image B. Further, that the decoding of the reference image B is not too much ahead, to ensure that the data of the reference image B is still in the first memory 12 when decoding the image C that depends on the reference image B.

Further it is required to scan efficiently through the compressed video stream to find the beginning of the next image, without having to decode the current image first. Both additions in the realization are relatively simple to implement.

In the following it is described which data are in the first memory 12:
1. Motion vectors of all images B and C that are decoded concurrently. Since motion vectors are available for every macro block, this requires only a fraction of a image store capacity.

2. Compressed video data for the images B, C that are concurrently decoded. (since this is data in the compressed domain, this also requires only a fraction of an image store)
3. Storing the parts of the reference images as depicted in FIG. 5. The required amount of first memory 12 depends on the maximum vector sizes.

Lets take SD MPEG as example: Lets calculate a B-image at the same time as the P-image used as reference. Assume that the motion vectors of the P-image are at most 64 pixels. To keep the required I-image data on-chip requires 128*720*1.5 equals 135 Kbytes. To calculate the B-image, we need the P-image as reference. Lets assume we also need 135 Kbytes to host the P-image reference data, and an 65 Kbytes for additional data on the I-image since the decoding of the B-image is typically behind the P-image. In total 335 Kbytes are required. Having more than one B-image does not increase the amount of first memory needed. Having more than two reference images (e.g. H.264) will increase the required amount of first memory.

In the following the encoding process is described. For video encoding, the same principle as for decoding can be used. One can encode the reference images and the images that depend on it at the same time. There are a number of advantages compared to decoding: When to encode a normal image or reference image can be decided freely.

The encoded stream is created in parallel. The encoded streams of different images have to be concatenated in the right order. This is simpler than the required parsing for decoding and requires no substantial computation power. During encoding, one may choose not to use all possible features of the standard. This allows for optimizations that take the properties of the hardware architecture into account. Some Examples:

One may choose to limit motion vectors such that the working set of image data does not exceed the on-chip buffer size.

Further one may choose to encode a B image with references to only a single image (so this B image uses references similar to a P image). Since a B image is only written, and a P image is also read, this reduces access on the local memory. It saves local buffer bandwidth.

In some cases, extra memory is required (trading bandwidth for memory consumption, which is still advantageous from cost point of view).

Some extra latency is added to the decoder; in many applications this is no problem at all (e.g. DVD decoding, broadcast, etc.)

In yet an other embodiment, a plurality of processing units 11x, 11y, 11z and first memories 12x, 12y, 12z is available, each located closely to their respective processing units 11x, 11y, 11z. In this case, additional communication means 14 between the first memories 12x, 12y, 12z take care to duplicate the image data over the first memories. An example of such system is a multi-processor system where each processing unit 11x, 11y, 11z is equipped with its own level 0 cache. Cache coherency hardware takes care of duplicating the image data over the various caches.

The FIG. 7 shows a plurality of processing units 11x, 11y, 11z, each connected to a first on-chip memory 12x, 12y, 12z. The first memories are connected to a communication network 14, which is also connected to an off-chip second memory 13. The communication network 14 supports both data transfers from a first memories 12x, 12y, 12z to the second memory 13, and between first memories 12x, 12y, 12z. The first memories 12x, 12y, 12z may reside close a CPU 11x, 11y, 11z as data cache. In such system, multiple images can be processed simultaneously such that a single processing unit 11x, 11y, 11z, processes each of the images. E.g. decoding of image B can be performed by processor 11x while processor 11y is decoding image C. Cache coherency needs to be handled in this system. In a pure hierarchical memory system, a cache miss in a first memory always causes an access in the second memory. However, with cache coherency, first a check is done whether the data is already available in any of the other on-chip caches. If that is the case, the other on-chip cache is used instead of the off-chip memory. This way, the data access to the bandwidth-limited off-chip memory can still be reduced. E.g. when image C is processed on processor 11y, data from image A is used as reference image and loaded into first memory 12y. Meanwhile, processor 11x is processing image B, which also reads image data from image A. The cache coherency functionality takes care that this data is taken from first memory 12y and loaded into first memory 12x to be available for processor 11x. This way, the image data of image A is still read only once from the off-chip second memory 13, while it is being used for simultaneous decoding of both image B and image C.

By use of the present invention following advantages are provided: A bandwidth reduction of about 40% on typical MPEG encoding/decoding (IBPBPBP) is achieved since only 3 full access to the second memory are required still in comparison to the conventional method in which 5 accesses to the second memory were required.

In case that more B-images are included in the group of pictures (E.g. a GOP structure of IBBPBBPBBP) a higher reduction is possible by increasing the number of images processed simultaneously.

Due to the reduced amount of accesses to the second memory the power consumption for encoding/decoding is decreased, which is very advantageously for mobile encoding.

The peaks in bandwidth are reduced so a more continuous bandwidth use is achieved.

The present invention may be applied on standards like MPEG, H.264. However it may be applied for a decoder independent of the encoder that has encoded the data, and vice versa. Further, it is applicable for SD to HD video.

The decoding algorithm is not impacted. There are no or minimal impacts on encoding algorithm. To implement the invention a very low impact on realisation of an encoder or decoder is required: it is required to add a synchronization process between the reference image producer and consumer. Further, it is required to add a search to start of next image in compressed data to start simultaneous decoding of multiple images. When encoding, the bit stream fragments that are produced simultaneously need to be concatenated in the right order. All these operations are relatively straightforward.

It is apparent that, in this invention, a wide range of different encoding or decoding methods may be used without deviating from the scope of the invention. This invention is not restricted by its specific encoding/decoding methods except being limited by the appended claims.

The numbers or letters between brackets "(" and ")" in the appended claims refer to elements of the figures. They are meant for illustrative and explanatory purposes only and must not be interpreted as limiting the scope of the claims.

The method described in this invention can be applied in an apparatus consisting of dedicated hardware units, or a programmable processing unit equipped with software code for the required functionality, or by programmable hardware configured for the required functionality, or any combination thereof.

The invention claimed is:

1. Method for encoding/decoding a video stream including a plurality of images in a video processing apparatus having a processing unit coupled to a first memory, further comprising a second memory, comprising:
   providing a subset of image data stored in the second memory in the first memory;
   simultaneous encoding/decoding of more than one image of the video stream, by accessing said subset, wherein the simultaneously encoding/decoding is performed by access sharing to at least one image.

2. Method as claimed in claim 1, further comprising:
   synchronizing the accesses in the first memory for ensuring that the accesses occur at substantially equal image positions in the shared image.

3. Method as claimed in claim 2, wherein the synchronization is based on a vertical location in the respective images.

4. Method as claimed in claim 3, wherein synchronization offsets are based on maximum vertical component of the motion vector.

5. Method as claimed in claim 1, wherein at least one of the simultaneously encoded/decoded images is used as a reference image for encoding/decoding at least one of the other simultaneously encoded/decoded images.

6. Method as claimed in claim 1, wherein the simultaneously encoded/decoded images share access to a common reference image.

7. Method as claimed in claim 1, further comprising:
   synchronizing the accesses in the first memory for ensuring that the decoding/encoding of the first image of the simultaneously encoded/decoded images is ahead of the reading position of the second image that depends on the first image.

8. Method as claimed in claim 1 for decoding a video stream, further comprising searching of the video stream for finding the beginning of a next image, without having decoded the image yet.

9. Method as claimed in claim 1 for encoding a video stream, wherein the data of simultaneously encoded images are concatenated to produce an image sequential bit stream.

10. A video processing apparatus comprising:
    a processing unit for performing an encoding/decoding process of video data;
    a first memory coupled to the processing unit for storing image data required for encoding/decoding of video data;
    a second memory, wherein the video stream includes a plurality of images; the first memory is adapted to store a subset of image data of the second memory in the first memory and the processing unit is adapted to simultaneously encode/decode more than one image of the video stream by accessing said subset of image data in the first memory, wherein the simultaneously encoding/decoding is performed by sharing access to at least one image.

11. Video processing apparatus as claimed in claim 10 having multiple processing units, each operating at the same time and processing a single image, further comprising a plurality of first memories, each associated to a respective processing unit, wherein a communication unit is provided between the first memories to provide data access to a first memory not directly associated to the processing unit that requires the data.

* * * * *